Patented Feb. 23, 1954

2,670,339

UNITED STATES PATENT OFFICE 2,670,339

SELF-HARDENING PLASTIC COMPOSITIONS AND POROUS BODIES PREPARED THEREFROM

Alvin M. Edmunds, Midland, Mich., assignor to The Dow Chemical Company, Midland, Mich., a corporation of Delaware No Drawing. Application October 29, 1952, Serial No. 317,595

6 Claims. (Cl. 260—41)

This invention concerns certain plastic compositions which harden on standing to form solid porous bodies having a satisfactory dimensional stability and good resistance against corrosive attack by aqueous solutions of acids or alkalies.

In my copending application, Serial No. 217,397, filed March 24, 1951, of which this is a continuation-in-part, there are disclosed plastic compositions comprising liquid phenol-formaldehyde resins as binders; granular calcined petroleum coke as an aggregate; and benzene sulfonyl chloride as a catalyst, or hardening agent, for causing solidification and hardening of the binder, which plastic compositions remain plastic for sufficient times to permit molding, casting, or other shaping of the same, but harden in a few hours at room temperature with formation of solid porous bodies suitable for use as filter media. The hardened porous bodies thus prepared have good dimensional stability and good resistance to corrosive attack by water, or by aqueous solutions of salts or acids. They frequently withstand the corrosive action of aqueous acids and aqueous alkalies for a considerable time, e. g. a month or longer, provided the acid and the alkali are alternately passed through the same at frequent intervals. However, they usually are badly corroded, or weakened, by prolonged contact with an aqueous alkali solution alone. Accordingly, filter plates, or spargers, etc., prepared from such compositions are not adapted for prolonged use under alkaline conditions.

In processes for the manufacture or use of chemicals, there often is need for dimensionally stable porous bodies, e. g. filter plates or spargers, that will withstand prolonged contact with either aqueous acids, or aqueous alkalies, or alternately with both, without becoming cracked, corroded or eroded to a serious extent. It is an object of this invention to provide plastic compositions which remain plastic for sufficient time to permit molding, casting, or other shaping of the same, and which harden on standing at room temperature or thereabout with formation of strong solid porous bodies having a satisfactory dimensional stability against development of cracks or other shrinkage or expansion flaws on standing and which are resistant to the corrosive action of most aqueous liquids, particularly water and aqueous solutions of acids and alkalies that are not strong oxidizing agents. Another object is to provide a method of making such plastic compositions. A further object is to provide the solid porous bodies resulting from solidification of the plastic compositions. Other objects will be evident from the following description of the invention.

The plastic compositions of the invention comprise, as essential ingredients, an incompletely condensed liquid furan resin; granules or particles of calcined petroleum coke as an aggregate; finer particles of amorphous carbon, or graphite, or a mixture of the two as a filler; and a mixture of benzene sulfonyl chloride and trichloroacetic acid as a catalyst, or hardening agent, for causing solidification of the furan resin. These several ingredients are employed in relative proportions hereinafter stated.

To be suitable for the purpose of the invention it is necessary that the plastic composition remain plastic for sufficient time to permit molding, casting, or other shaping of the same into useful articles, e. g. filter plates or spargers; that it have property of solidifying and hardening upon standing at room temperature; that the hardened compositions have good strength and sufficient dimensional stability against occurrence of continued shrinkage or expansion so that filter plates, spargers, etc., prepared therefrom do not develop cracks or other flaws due to a change in volume; and that the hardened articles be capable of withstanding prolonged contact with aqueous solutions of acids or alkalies without being rendered unserviceable. The above-mentioned essential ingredients of the plastic compositions of the invention coact to meet these several requirements.

More specifically, the liquid furan resin ingredient of the compositions serves as a polymerizable binder having a property of wetting the calcined petroleum coke granules and, when solidified, of bonding the granules together. The liquid furan resins which are employed for this purpose are all based on furfuryl alcohol and contain at least 50 per cent by weight of chemically combined furfuryl alcohol. Methods for making the liquid furan resins are well known and need not be described in detail. However, it may be mentioned that the liquid furan resins which are employed are prepared by a chemical condensation of furfuryl alcohol with itself or with a lesser amount by weight of one or more co-condensible organic compounds such as furfuraldehyde, formaldehyde, maleic anhydride, phenol, or acetone, in the presence of a condensing agent, usually an acid, which is neutralized or removed when the reaction has progressed to a point at which the mixture has a desired viscosity value. A number of liquid furan resins are available on the market.

The calcined petroleum coke is highly resistant to chemical attack by non-oxidizing acids or alkalies and serves as the aggregate in the plastic compositions. It is ordinary petroleum coke that has been heated at high temperatures, e. g. between 800° and 1500° C. and advantageously between 1100° and 1400° C., to remove volatile components therefrom. It is a solid cellular material comprising individually closed cells. It possesses good strength and is readily wetted by the liquid furan resins.

The finely divided amorphous carbon or graphite serves to thicken, i. e. increase the viscosity of, the liquid furan resin and to plug minute pores or other openings in the coarser granules of the calcined petroleum coke aggregate. It thereby limits absorption of the liquid resin by the aggregate granules so that the latter are surface-wetted, and becomes bonded together, by the resin.

The mixture of benzene sulfonyl chloride and trichloroacetic acid has a delayed action, usually of an hour or more, in causing solidification of the furan resin ingredient. This permits time for molding, casting, or otherwise shaping the plastic composition into useful articles before it sets up. The mixture of benzene sulfonyl chloride and trichloroacetic acid then causes solidification and hardening of the composition at room temperature with formation of a solid porous body that, after its initial set, undergoes only a slight change in volume, usually a shrinkage amounting to not more than a 0.3 per cent change in a linear dimension thereof, which volume change is usually not sufficient to cause development of cracks or flaws in filter plates, spargers, or other articles of the composition.

The time after adding a catalyst to the liquid furan resin ingredient until the plastic composition solidifies, and the amount of volume change which the composition undergoes after becoming hardened, are dependent, to a considerable extent, on the kind of catalyst, or hardening agent, used for causing solidification of the liquid furan resin ingredient. Most catalysts, e. g. hydrochloric acid, sulfuric acid, para-toluene sulfonyl chloride, or paratoluene sulfonic acid, etc., heretofore used for the solidification and hardening of such resins either cause a very rapid reaction, not permitting time for molding of a composition containing the resin, before solidification occurs, or cause formation of a hardened body that continues to undergo a gradual, but pronounced, volume change, usually shrinkage, that often causes development of cracks in the hardened articles. Thus, the hardening agents, i. e. mixtures of benzene sulfonyl chloride and trichloroacetic acid, which are employed in the invention cannot satisfactorily be replaced by the usual catalysts. Also, such catalyst mixtures are superior to either of the individual ingredients thereof for the purpose of the invention.

Although liquid furan resins of any viscosity can be used in making the plastic compositions, those of low viscosity, e. g. 50 centipoises at 25° C. or lower, are less convenient to use than those of higher viscosity. The plastic compositions prepared using the liquid resins of low viscosity frequently solidify more rapidly than desired, e. g. in from 15 minutes to an hour after adding the catalyst ingredient, and after becoming hardened are often of lower tensile strength than are compositions prepared similarly except for use of a liquid furan resin of higher viscosity. The liquid furan resin starting materials are advantageously of at least 100, preferably from 200 to 4000, centipoises viscosity at 25° C. Liquid furan resins of even higher viscosities can be used, but are more difficult to admix thoroughly with the other ingredients of the composition. As hereinbefore mentioned, certain of the liquid furan resins are available on the market, but they usually are of lower viscosity than desired. In such instance, they may be treated with a small proportion, usually from 0.3 to 2 per cent by weight, of a catalyst, so as to cause them to thicken until of a desired viscosity value, before employing them in making the plastic compositions of the invention. Any of the aforementioned catalysts can be used to accomplish such preliminary thickening of a liquid furan resin, but mixtures of benzene sulfonyl chloride and trichloroacetic acid are preferred. The minor amount of catalyst used for such preliminary thickening of the liquid resin can be retained in the plastic compositions prepared therefrom.

The liquid furan resins are substantially insoluble in water, but frequently contain dissolved water, e. g. in amounts up to 20 per cent by weight or higher. Such dissolved water serves as a diluent to extend the covering power of the resin in surface-treating the calcined petroleum coke granules. Accordingly, the proportions of the liquid resin-containing ingredient required in the plastic compositions do not vary greatly with change in its water content, and the proportions of liquid furan resin hereinafter stated are inclusive of any water contained therein.

In preparing the plastic compositions, the liquid furan resin is used in amount sufficient to wet the particles and granules of the filler, i. e. amorphous carbon or powdered graphite, and the calcined petroleum coke, but not sufficient to fill completely the interstices between the calcined petroleum coke granules. After becoming hardened, the porosity of the composition is dependent upon the interstices and may be varied by changes in the relative proportions of the aforementioned starting materials, particularly the liquid resin and the calcined petroleum coke. The porosity of the hardened composition is also dependent in part on the size of the calcined petroleum coke granules. In general, the porosity increases with increase in the average size of the calcined petroleum coke granules and decreases with increase in the ratio by weight of liquid resin to granular coke of a given mesh size employed in preparing the plastic composition. The calcined petroleum coke granules may be of sizes ranging from 48 mesh to 2 mesh size or larger, based on the Tyler screen scale, but usually are of from 4 to 10 mesh size. The amorphous carbon or powdered graphite, which is used as a filler to thicken the liquid furan resin and to plug any pores in the calcined petroleum coke granules, is usually a graded material of from 50 to 400 mesh particle size or smaller.

The proportions of filler which may most advantageously be used for thickening the liquid furan resin vary somewhat with changes in the initial viscosity of the resin and with changes in average particle size of the filler. In general, the filler is added to the liquid resin, or to a mixture of the liquid resin and catalyst, in a proportion such that when a cylinder, open on both ends and of 1⅝ inches internal diameter and 2 inches height, is placed on a horizontal glass plate and filled with the thickened resin, and the cylinder then removed, and contents adhering to the cylinder are scraped therefrom and added to the resin on the plate, the resulting column of thickened resin spreads at a rate such that it has an average diameter of between 2½ and 7 inches, preferably not more than 5½ inches, 15 minutes after removal of the cylinder. In most, if not all, instances the proportions of filler required to thicken the liquid furan resin so that the resulting admixture, not containing the aggregate, possesses the above flow rates are within the limits hereinafter given.

The catalysts, or hardening agents, which are employed in the plastic compositions are mixtures of from 40 to 80 per cent by weight of benzene sulfonyl chloride and from 20 to 60 per cent of trichloroacetic acid. A saturated solution of trichloroacetic acid in benzene sulfonyl chloride is readily prepared, highly effective, and is preferred. At room temperature such saturated solution contains approximately 47.2 per cent by weight of trichloroacetic acid and about 52.8 per cent of benzene sulfonyl chloride. The catalyst mixture is usually employed in amount corresponding to from 10 to 25 per cent of the weight of the liquid furan resin, but it can be used in smaller or larger amounts, e. g. in proportions corresponding to from 7 to 45 per cent of the weight of the resin. In general, an increase in proportion of the catalyst mixture results in a decrease in the time, after addition of the catalyst, when the liquid resin becomes solidified. The benzene sulfonyl chloride and trichloroacetic acid are usually premixed before being added to the resin, but they can, although less conveniently, be added individually.

The granular calcined petroleum coke is used in proportions corresponding to from 45 to 80 per cent of the combined weight of all of the starting materials.

The manner in which the starting materials are admixed may be varied somewhat, but the ease of mixing to obtain a substantially uniform plastic composition is dependent in part on the order and manner of mixing. The catalyst is preferably first mixed with the liquid furan resin and the carbon or graphite filler is added to cause thickening of the mixture. Alternatively, the catalyst may be mixed with the filler and the mixture be added to the liquid resin. The granular calcined petroleum coke is advantageously then added in large portions and thoroughly stirred together with the other ingredients. It is important that the filler be admixed with the liquid resin before adding the calcined petroleum coke, since otherwise the coke absorbs an excessive amount of the resin. It is also important that preparation of the plastic composition and molding or other shaping of the composition be completed fairly soon after admixing the catalyst and liquid resin, since there is a limited time, usually an hour or more, over which the resin remains liquid after adding the catalyst. After mixing together the liquid resin, catalyst and filler, it has been found most convenient to add the calcined petroleum coke as from three to four about equal-sized portions with stirring of the mixture following each addition.

The plastic composition solidifies at room temperature within a few hours, usually from 1 to 12 hours, after it is formed. It continues to increase in hardness and undergo an appreciable volume change, usually shrinkage, for about one day after it solidifies, but this shrinkage during hardening usually does not result in cracks or other flaws in the hardened articles. The shrinkage, or other volume changes occurring thereafter are slight and gradual. They seldom, if ever, cause development of cracks in the hardened articles. The steps of solidifying and hardening the compositions may be accelerated be warming them.

While in a plastic condition, the compositions may be shaped by usual operations such as troweling, rolling, or tamping, etc. During such operations, the trowel, or other tool, may advantageously be wiped from time to time with a cloth moistened with acetone, or other solvent for the resin, so as to prevent sticking of the composition to the tool. Prior to rolling or tamping the composition, the latter may be covered with a flexible metal sheet, e. g. of iron, coated on the underside with petroleum oil or the like. After the rolling or tamping operation, the sheet is removed and the composition permitted to harden in place. The hardened porous bodies, thus formed not only have good dimensional stability and good resistance to corrosive attack by aqueous acids and alkalies, but are insoluble in usual organic solvents such as benzene, toluene, alcohol, etc., and in most instances are not materially damaged by contact with such organic liquids.

The following examples describe ways in which the invention has been practiced, and illustrate certain of its advantages, but are not to be construed as limiting its scope.

EXAMPLE 1

A liquid furan resin was prepared by adding, to a mixture of 2 kilograms of furfuryl alcohol and 40 grams of paraformaldehyde, 63 grams of maleic anhydride portionwise in 20 minutes with stirring. The mixture was stirred and heated first at 60° C. for 2 hours, then at 75° C. for 4 hours. The mixture was then subjected to distillation under vacuum, whereby approximately 10 weight per cent of the same was removed as low boiling materials, e. g. water and unreacted furfuryl alcohol. The remaining product was a liquid furan resin having a viscosity of 660 centipoises at 25° C. Approximately 1.47 parts by weight of benzene sulfonyl chloride and 1.32 parts of trichloroacetic acid were mixed with 18.7 parts of the liquid furan resin. The solution was thickened by admixing therewith 21.5 parts of graded graphite powder ranging from 50 to 400 Tyler screen mesh particle size. To the resulting mixture there was added, as three approximately equal-sized portions, 57 parts of calcined petroleum coke in the form of granules of from 5 to 10 mesh size. The mixture was stirred thoroughly during and after each such addition. The resultant plastic composition was shaped into briquettes which, after becoming hardened, would be suitable for use in determining properties of the composition. Each briquette was one inch thick and of 1 inch square cross section at the midpoint of its length. The end portions of the briquettes were widened in a tapered manner to permit gripping of the same. After being formed, the briquettes hardened on standing at room temperature in from 3 to 5 hours. Seven days after it had been formed and hardened, a briquette of the composition was tested to determine its tensile strength. It was found to have a tensile strength of 785 pounds per square inch of cross section at the point of breakage. Twenty-five days after it had hardened, another of the briquettes was tested to determine its permeability to water. In the test, water under a pressure corresponding to a head of 1 foot of water, was fed to one face of the briquette and the rate of flow of water through the 1-inch thickness of the briquette was measured. The permeability value thus found was 32.5 gallons of water per minute per square foot of area for one face of the briquette. Seven days after becoming hardened, another briquette of the composition was immersed in an aqueous hydrochloric acid solution of 20 weight per cent concentration, and the mixture heated to a temperature of 110° C. Another briquet was immersed in an aqueous sodium hydroxide solution of 10 weight per cent concentration that was at a temperature of 25° C. The briquettes were immersed in these solutions for 30 days and throughout this period the solutions were maintained at the respective temperatures just mentioned. Each briquette was then removed from the bath and, after the acid or alkali solution had drained therefrom, washed with water and tested to determine its tensile strength. The briquette which had been immersed in the hot other briquette of each composition was immersed for 30 days in a 20 per cent hydrochloric acid solution heated to 110° C. and was then removed, washed with water, and tested for tensile strength. This test was carried out as described in Example 1. Table I names and gives the range of Tyler mesh sizes for granules of the aggregate which was employed in each composition. The table also gives the relative proportions, as parts by weight, of the liquid furan resin, the above-mentioned hardening agent, powdered graphite and the aggregate used in preparing each of the plastic compositions. It gives the tensile strength, in pounds per square inch, of each composition, the water-permeability in gallons per minute per square foot of a one inch thick test piece of the hardened composition, and the tensile strength in pounds per square inch of a briquette of each composition after the briquette had been immersed for 30 days in the hot hydrochloric acid solution. The table also expresses the tensile strength of each acid-treated composition as per cent of the strength which the composition possessed prior to being immersed in the acid.

*Table I*

| Run No. | Plastic Composition | | | | | | Properties of Hardened Composition | | | |
|---|---|---|---|---|---|---|---|---|---|---|
| | Furan Resin, Pts. | Hardening Agent, Pts. | Graphite, Pts. | Aggregate | | | Tensile Strength, lbs./sq. in. | $H_2O$ Permeability, gal./min./sq. ft. | Tensile Strength After Acid Treatment | |
| | | | | Kind | Mesh Size | Pts. | | | lbs./sq.in. | Percent of Orig. Strength |
| 1 | 18.7 | 2.79 | 21.5 | Calcined Petroleum Coke | 5-10 | 57 | 785 | 32.5 | 723 | 92.0 |
| 2 | 11.3 | 1.70 | 13.0 | Brick Chips | 5-10 | 74 | 385 | 54.3 | 210 | 54.7 |
| 3 | 19.57 | 2.93 | 22.5 | Calcined Petroleum Coke | 4-6 | 55 | 463 | 58.7 | 320 | 69.3 |
| 4 | 19.57 | 2.93 | 22.5 | Foundry Coke | 4-6 | 55 | 302 | 65.4 | 148 | 49.0 |
| 5 | 8.70 | 1.30 | 10.0 | $SiO_2$ | 4-6 | 80 | 367 | 27.9 | 189 | 51.5 |
| 6 | 8.70 | 1.30 | 10.0 | Quartz | 4-6 | 80 | 443 | 28.6 | 100 | 22.6 |
| 7 | 8.70 | 1.30 | 10.0 | Fused MgO | 4-6 | 80 | 89 | 42.1 | (¹) | nil |

¹ Too low to measure.

acid solution had a tensile strength of 723 pounds per square inch and the briquette that had been immersed in the alkali solution had a tensile strength of 572 pounds per square inch.

EXAMPLE 2

A number of plastic compositions were prepared by dissolving minor amounts of a hardening agent, consisting of a mixture of approximately 53 per cent by weight benzene sulfonyl chloride and 47 per cent trichloroacetic acid, in separate portions of a liquid furan resin similar to that employed in Example 1. Each resulting solution was thickened by admixing graphite powder of from 50 to 400 mesh particle size therewith. To each of the thickened solutions, a granular aggregate was added in three equal portions with stirring of the mixture during and after each addition. The compositons differed from one another as to the kind of aggregate employed and as to the relative proportions in which the several starting materials were used. Each plastic composition thus prepared was molded into briquettes of 1-inch thickness, as described in Example 1. The test pieces hardened on standing at room temperature. Thereafter, briquettes of each composition were used in determining the tensile strength and water-permeability, respectively, of the composition, as described in Example 1. An-

EXAMPLE 3

This example illustrates the fact that a composition of the invention which has been prepared using a liquid furan resin of less than 50 centipoises absolute viscosity at 25° C. is, after becoming hardened, of lower tensile strength than other compositions similarly prepared except for use of liquid furan resins of higher viscosities as starting materials. The example also shows that the hardened compositions of the invention possess good dimensional stability, i. e. they undergo only slight shrinkage or other volume change after becoming hardened. The resin starting material used in the experiments of this example was a commercial liquid furan resin, i. e. a liquid condensation product of furfuryl alcohol as a principal ingredient, which liquid resin when obtained, had a viscosity of 15 centipoises at 25° C. Separate portions of this liquid were treated with between 1 and 2 per cent by weight of a saturated solution of trichloroacetic acid in benzene sulfonyl chloride and permitted to stand at room temperature until they were of the respective viscosity values indicated in the following table. To 17.8 parts by weight of each of the thus treated portions of the liquid resin, there were added, with stirring, 2.26 parts of benzene sulfonyl chloride, 2.02 parts of trichloroacetic acid and then 20.9 parts of powdered graphite. To each resulting mixture, 57 parts of calcined petroleum coke, in the form of granules of from 5 to 10 mesh size, was added as three aproximately equal portions with thorough stirring of the mixture after each addition. From each of the resulting plastic compositions there were molded briquettes of 1-inch thickness similar to those described in Example 1. From each, except one, of the compositions there was also molded a test bar of 1 inch square cross section and approximately 10 inches length. After becoming hardened, briquettes of each composition were used to determine the tensile strength and water-permeability, respectively, of the composition, as described in Example 1. The tensile strength was determined with a briquette that had stood seven days after it had set up to a rigid body and the water-permeability was determined with a briquette that had stood twenty-five days after it had set up. Approximately 24 hours after it had set up at room temperature as a rigid body, the hardened test bar was measured for original length. It was then allowed to stand at room temperature and from time to time was again measured for length. It was noted that on standing each bar shrunk slightly and thereafter expanded slightly to approach its original length, but these changes in length were very small. Table II identifies each composition by giving the viscosity in centipoises at 25° C. of the liquid furan resin ingredient at the time it was mixed with the powdered graphite during preparation of the composition. The table gives the tensile strength in pounds per square inch and the water-permeability, under a 1-foot water head pressure, in gallons of water flowing per minute per square foot of area through a 1-inch thick section of each composition. It also gives the per cent shrinkage of each test bar at stated times after the length of the bar was first measured, each shrinkage value being the difference between the length of the bar after the stated period of standing and its original length, expressed as per cent of the original length of the test bar.

briquettes similar to those described in Example 1. These set up as rigid bodies on standing a few hours at room temperature. Approximately seven days after it had set up as a solid, rigid body, one of the briquettes was tested and found to have a tensile strength of 825 pounds per square inch. Another hardened briquette was then immersed in an aqueous hydrochloric acid solution of 20 weight per cent concentration and the latter was heated at 110° C. for thirty days. Another hardened briquette was immersed in an aqueous sodium hydroxide solution of 10 per cent concentration and was maintained therein at 25° C. for the thirty day period. The briquettes were then removed from the baths, washed with water and tested for tensile strength. The briquette that had been immersed in the hot hydrochloric acid solution had a tensile strength of 790 pounds per square inch. The briquette that had been immersed in the sodium hydroxide solution had a tensile strength of 940 pounds per square inch. Twenty-five days after it had set up as a rigid body, another of the briquettes was tested for water-permeability, as described in Example 1. Under a water pressure corresponding to a 1-foot head of water, a 1-inch thick section of the briquette permitted flow of water therethrough a rate of 34.9 gallons of water per minute per square foot area on one face of the briquette.

I claim:

1. A plastic composition, having a property of hardening at room temperature to form a rigid, porous body that is resistant to corrosive attack by aqueous acid solutions and by aqueous alkali solutions, which composition comprises a mass of calcined petroleum coke granules having outer surfaces thereof wetted with a liquid furan resin containing at least 50 per cent by weight of chemically combined furfuryl alcohol, a resin-hardening catalyst consisting essentially of from 40 to 80 per cent by weight of benzene sulfonyl chloride and from 20 to 60 per cent of trichloroacetic acid, and a finely-divided filler of the group consisting of amorphous carbon, graphite and

*Table II*

| Run | Viscosity of Resin Ingredient, cps. at 25° C. | Properties of Hardened Compositions | | | | | | | | |
|---|---|---|---|---|---|---|---|---|---|---|
| | | Tensile Strength, lbs./sq. in. | H₂O Permeability, gal./min./sq. in. | Percent Shrinkage After— | | | | | | |
| | | | | 1 Day | 5 Days | 10 Days | 20 Days | 30 Days | 60 Days | 90 Days | 120 Days |
| 1 | 46.4 | 312 | 48.25 | (¹) | (¹) | (¹) | (¹) | (¹) | (¹) | (¹) | (¹) |
| 2 | 248 | 830 | 23.08 | 0.053 | 0.073 | 0.080 | 0.083 | 0.083 | 0.079 | 0.079 | 0.068 |
| 3 | 438 | 895 | 18.92 | 0.027 | 0.052 | 0.061 | 0.063 | 0.061 | 0.047 | 0.038 | 0.028 |
| 4 | 913 | 960 | 24.64 | 0.065 | 0.097 | 0.108 | 0.113 | 0.112 | 0.106 | 0.108 | 0.094 |
| 5 | 1,230 | 828 | 20.12 | 0.040 | 0.074 | 0.078 | 0.088 | 0.081 | 0.073 | 0.064 | 0.047 |

¹ Not measured.

EXAMPLE 4

A plastic composition was prepared by adding a solution consisting of 1.32 parts trichloroacetic acid and 1.47 parts benzene sulfonyl chloride to 18.7 parts of a commercial liquid furan resin, i. e. a liquid condensation product of furfuryl alcohol as a principal ingredient, which liquid resin initially had a viscosity of 1,113 centipoises at 25° C.; adding 21.5 parts of graphite powder with stirring; and then adding 57 parts of calcined petroleum coke in the form of granules of from 5 to 10 mesh size. Te coke was added in three approximately equal portions with thorough stirring of the mixture after each addition. The resulting composition was molded into mixtures of amorphous carbon and graphite, the finely divided filler being in amount sufficient to thicken the liquid furan resin and limit absorption of the same by the calcined petroleum coke granules, and the liquid furan resin being in amount sufficient for surface-wetting of the calcined petroleum coke granules and insufficient to fill completely the interstices between said granules.

2. A composition, as described in claim 1, wherein the calcined petroleum coke granules are of from 2 to 48 mesh size and the filler is of from 50 to 400 mesh particle size.

3. A rigid, porous article consisting essentially of the composition of claim 1 in hardened condition.

4. A rigid, porous article consisting essentially of the composition of claim 2 in hardened condition.

5. A method of making a rigid, porous article that is resistant to corrosive attack by aqueous acid solutions and by aqueous alkali solutions, which method comprises admixing with a liquid furan resin, containing at least 50 per cent by weight of furfuryl alcohol in chemically combined form, a catalyst consisting essentially of from 40 to 80 weight per cent of benzene sulfonyl chloride and from 20 to 60 per cent of trichloroacetic acid, and a finely divided filler of the class consisting of amorphous carbon, graphite and mixtures of amorphous carbon and graphite, the filler being in amount sufficient to thicken the liquid furan resin, and thereafter adding calcined petroleum coke granules of from 2 to 48 mesh size in amount such as to be surface-wetted by the liquid furan resin without completely filling the interstices between said granules, the last-mentioned addition being made by adding the coke in portions with stirring of the mixture after each addition, shaping the resulting plastic composition, and causing it to harden by standing.

6. A method, as described in claim 5, wherein the liquid furan resin starting material is one having a viscosity of at least 100 centipoises at 25° C.

ALVIN M. EDMUNDS.

No references cited.